US012246542B2

(12) United States Patent
Kamitani

(10) Patent No.: US 12,246,542 B2
(45) Date of Patent: Mar. 11, 2025

(54) THERMAL TRANSFER SYSTEM INCLUDING HEATING ELEMENT HAVING CONTACT PORTION WITH MULTIPLE PROJECTING PORTIONS

(71) Applicant: Dai Nippon Printing Co., Ltd., Tokyo (JP)

(72) Inventor: Nobuyuki Kamitani, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 142 days.

(21) Appl. No.: 18/006,619

(22) PCT Filed: Aug. 3, 2021

(86) PCT No.: PCT/JP2021/028823
§ 371 (c)(1),
(2) Date: Jan. 24, 2023

(87) PCT Pub. No.: WO2022/030510
PCT Pub. Date: Feb. 10, 2022

(65) Prior Publication Data

US 2023/0264485 A1 Aug. 24, 2023

(30) Foreign Application Priority Data

Aug. 3, 2020 (JP) ................................ 2020-131844

(51) Int. Cl.
*B41J 2/325* (2006.01)
*B41J 2/335* (2006.01)
*B41M 5/382* (2006.01)

(52) U.S. Cl.
CPC ............... *B41J 2/325* (2013.01); *B41J 2/335* (2013.01); *B41M 5/382* (2013.01)

(58) Field of Classification Search
CPC . B41J 2/325; B41J 2/335; B41J 17/38; B41M 5/382
See application file for complete search history.

(56) References Cited

U.S. PATENT DOCUMENTS 4,788,559 A 11/1988 Ende
2005/0140769 A1 * 6/2005 Kanemaru ............... B41J 2/325 347/171
2019/0202212 A1 7/2019 Kuroda et al.

FOREIGN PATENT DOCUMENTS

JP H01-93374 A 4/1989
JP 1990-19558 * 2/1990 ................ B41J 3/20
(Continued)

OTHER PUBLICATIONS

Extended European Search Report dated Jul. 8, 2024 (Application No. 21852360.3).
(Continued)

*Primary Examiner* — Henok D Legesse
(74) *Attorney, Agent, or Firm* — BURR PATENT LAW, PLLC

(57) ABSTRACT

A thermal transfer system includes a winding portion that winds an ink ribbon that includes a support layer and an ink layer after ink in the ink layer is transferred to a transfer receiver, and a heating element that transfers the ink in the ink layer of the ink ribbon to the support layer of the ink ribbon that is located inside the ink ribbon that is wound around the winding portion in a stripe-shaped disturbing pattern DP1 that extends in a direction in which the ink ribbon is conveyed in a manner in which the ink ribbon that is wound around the winding portion is heated from the support layer. The heating element includes a contact portion including multiple projecting portions that come into contact
(Continued)

with the ink ribbon and multiple recessed portions that do not come into contact with the ink ribbon.

7 Claims, 8 Drawing Sheets

(56) References Cited

FOREIGN PATENT DOCUMENTS

| | | | |
|---|---|---|---|
| JP | H02-019558 | U | 2/1990 |
| JP | 2013-111866 | A | 6/2013 |
| JP | 2018-108665 | A | 7/2018 |

OTHER PUBLICATIONS

International Search Report and Written Opinion (Application No. PCT/JP2021/028823) dated Oct. 26, 2021.
English translation of the International Preliminary Report on Patentability (Chapter I) dated Feb. 16, 2023 (Application No. PCT/JP2021/028823).

* cited by examiner

[Fig.1]
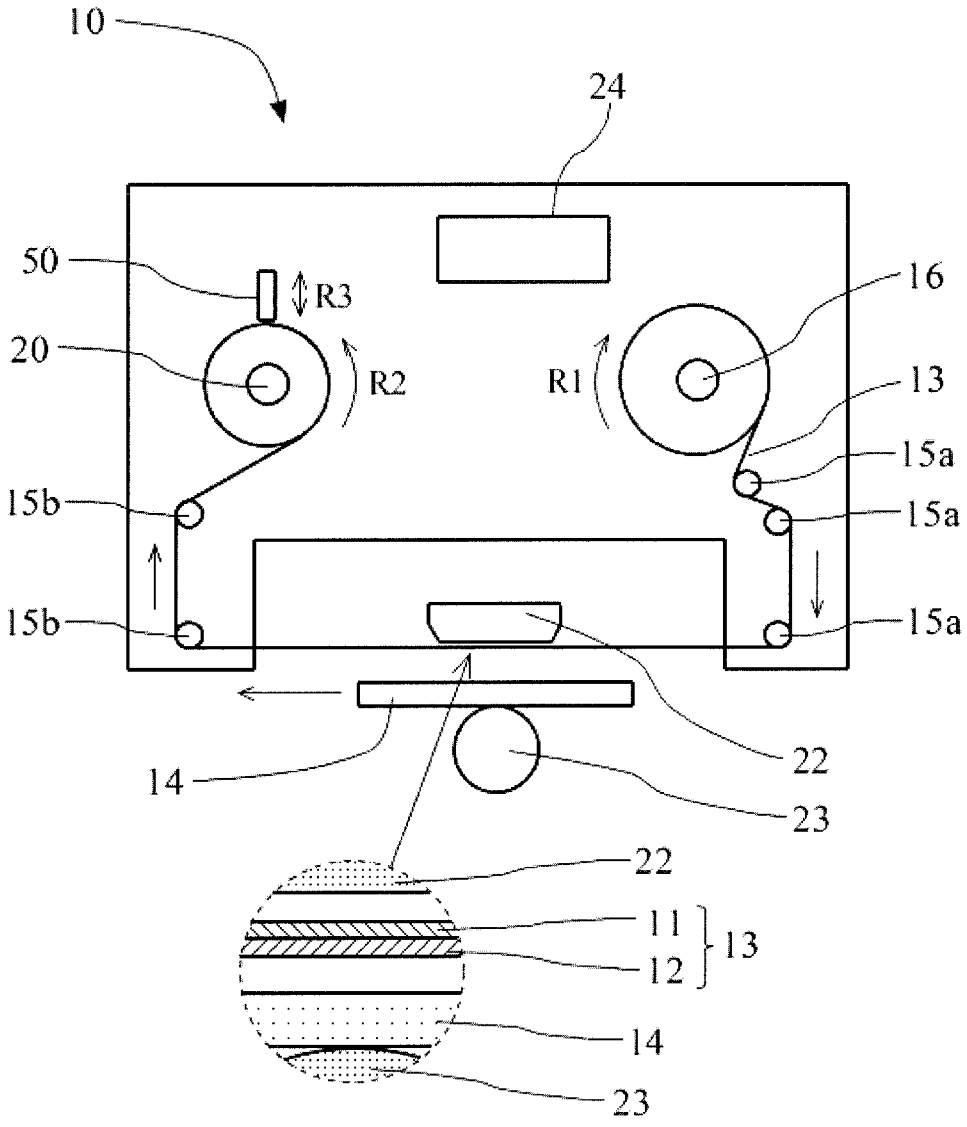

[Fig.2A]
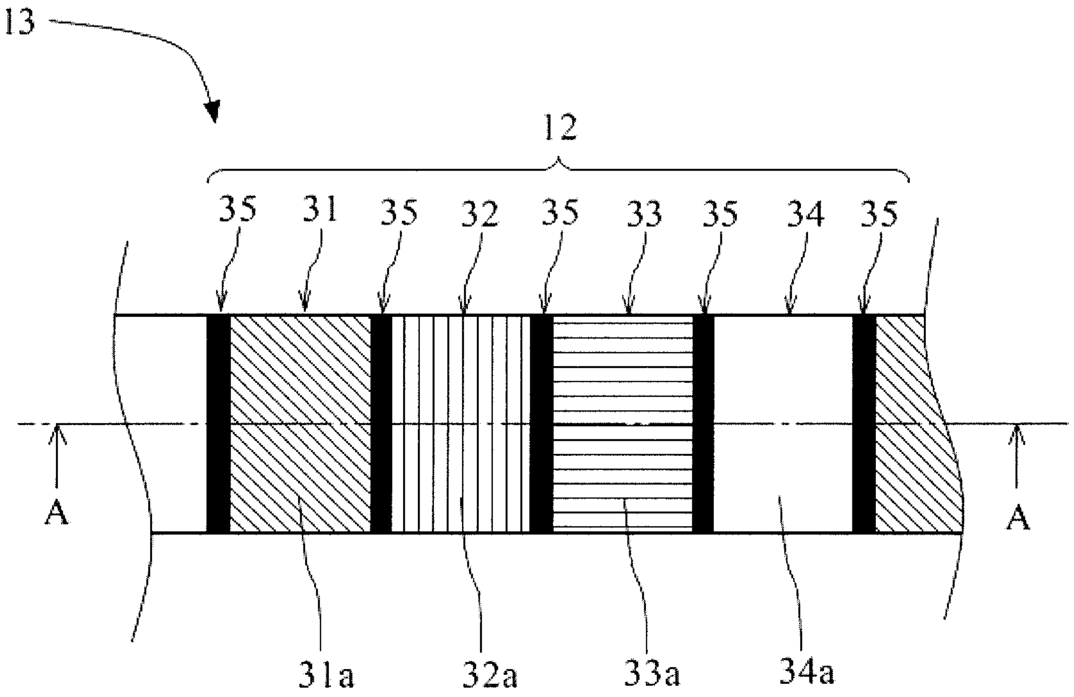
[Fig.2B]
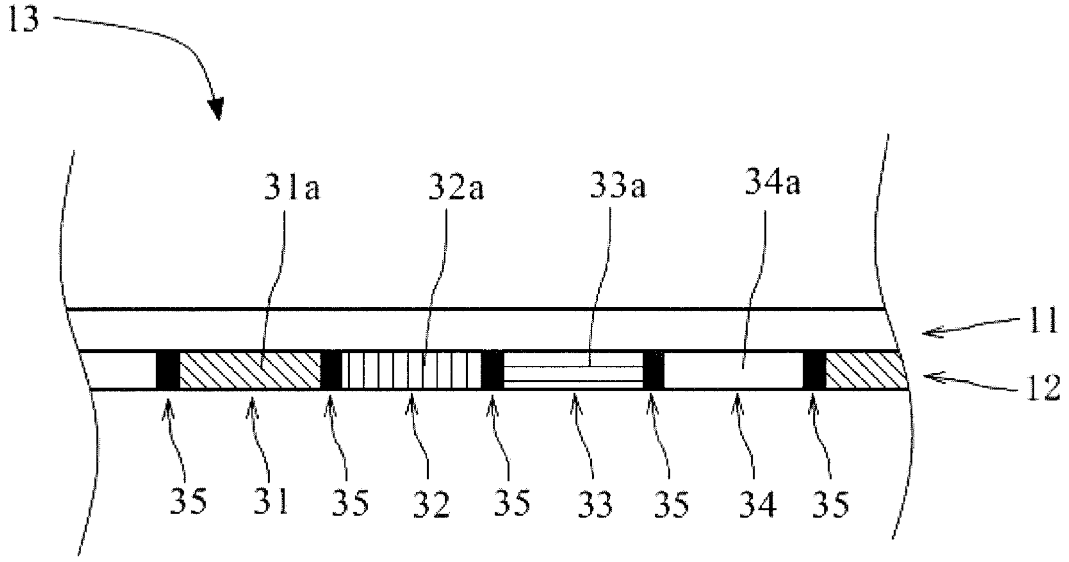

[Fig 3A]
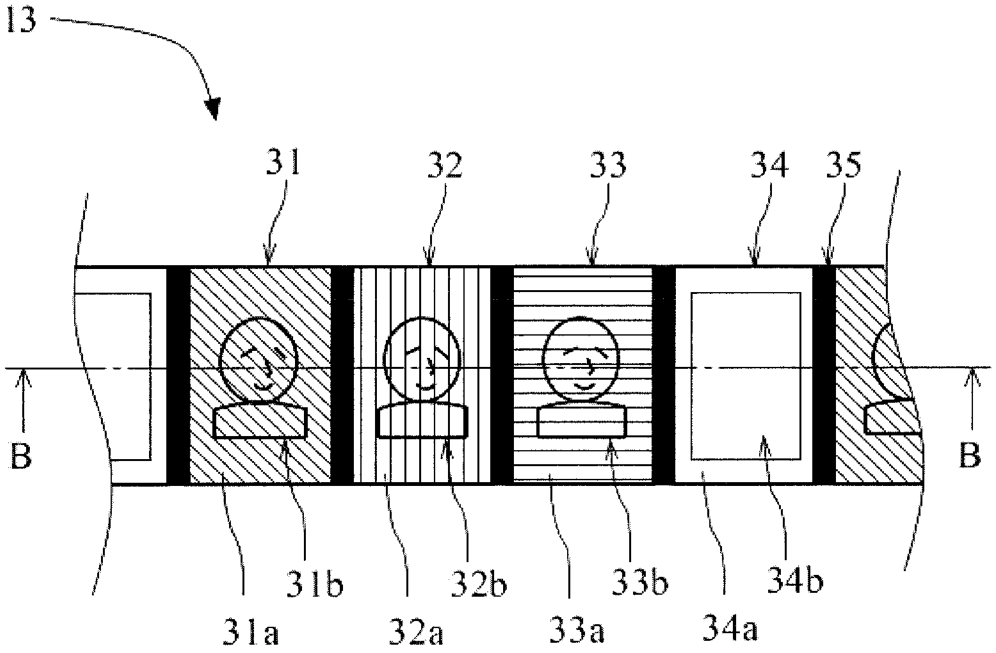
[Fig.3B]
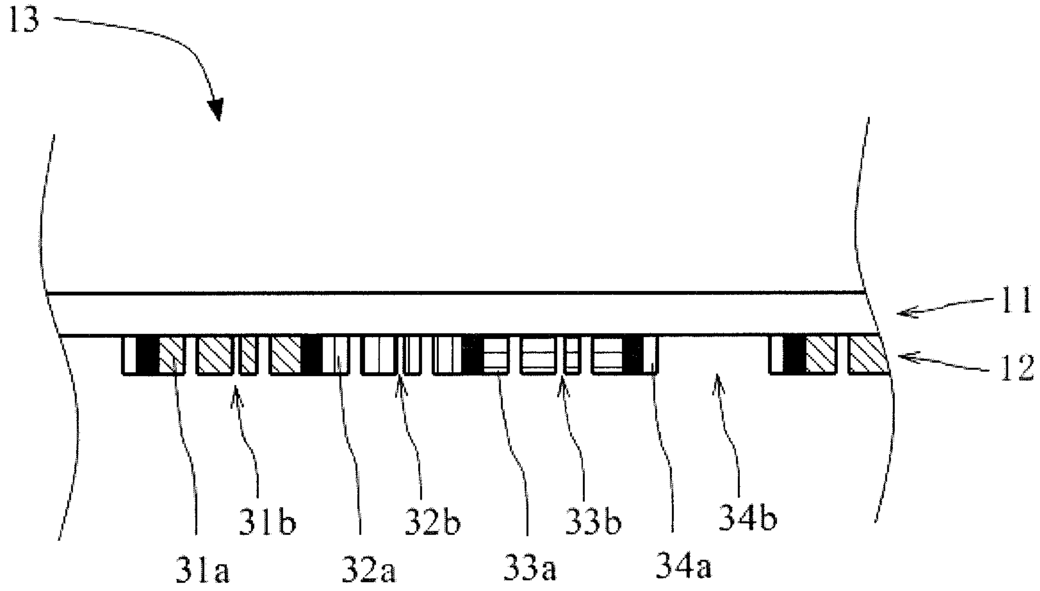

[Fig.4]
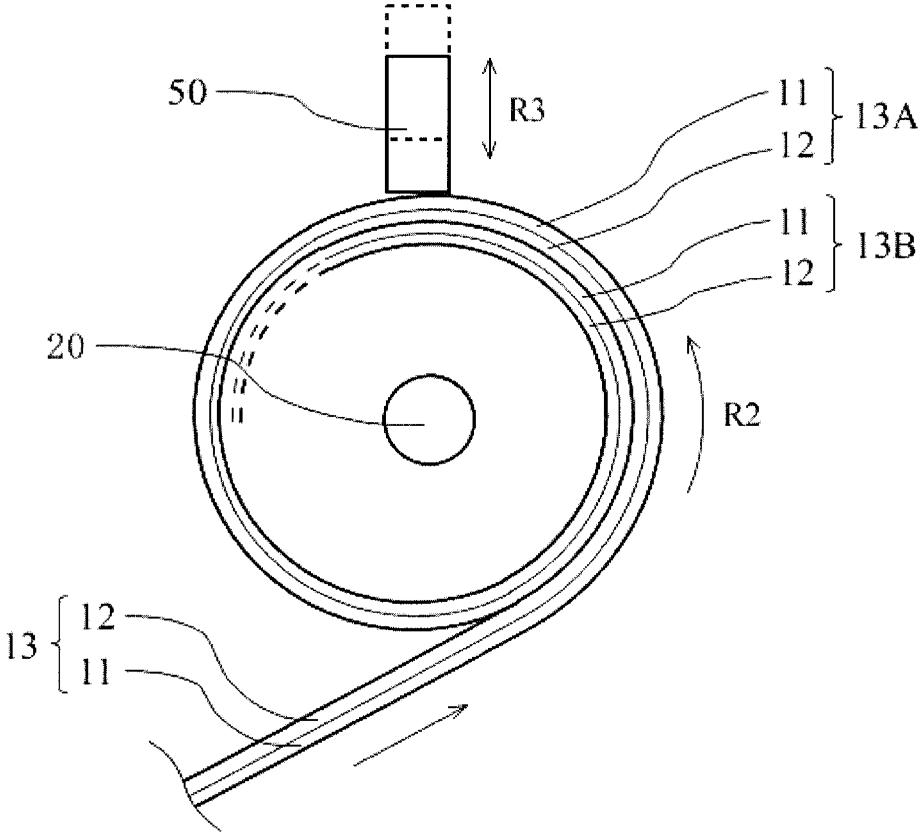

[Fig.5A]
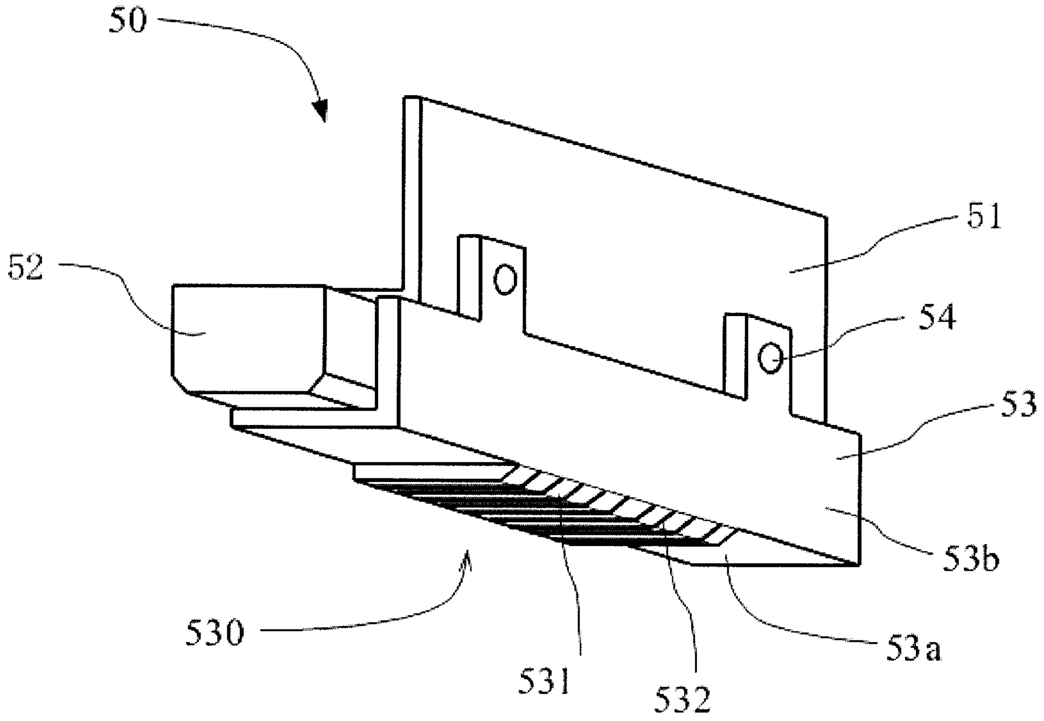

[Fig.5B]
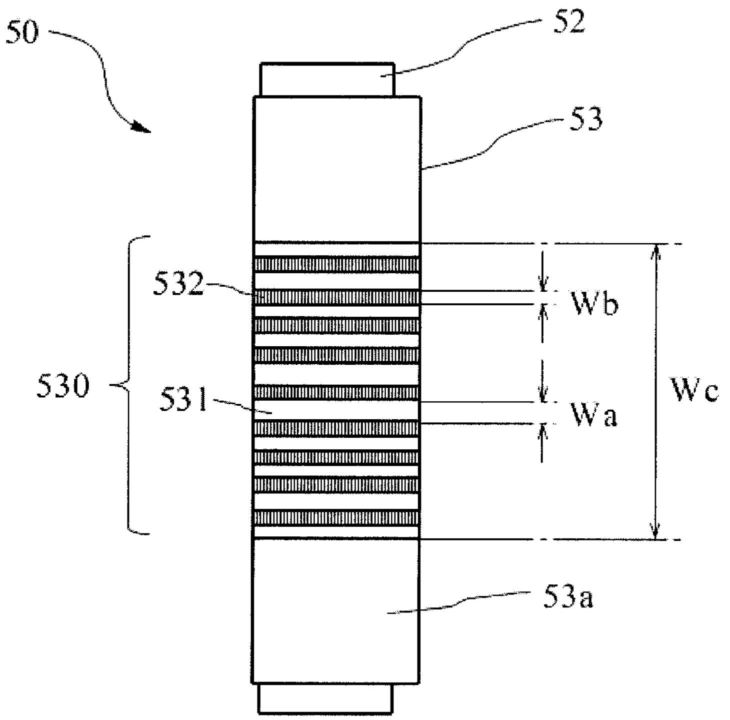
[Fig 6]
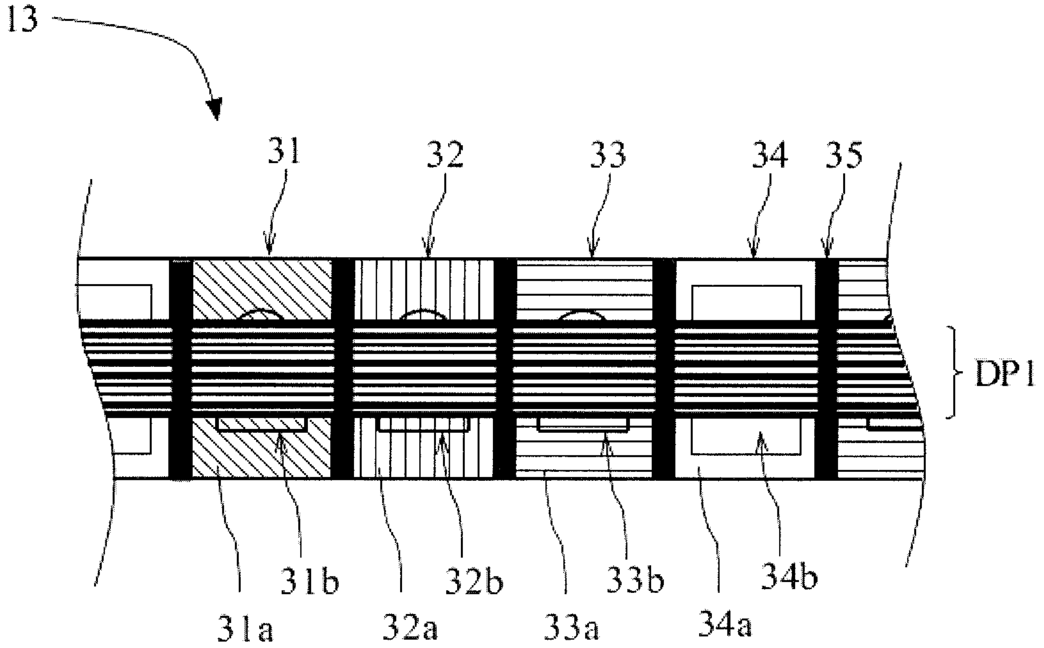

[Fig.7]
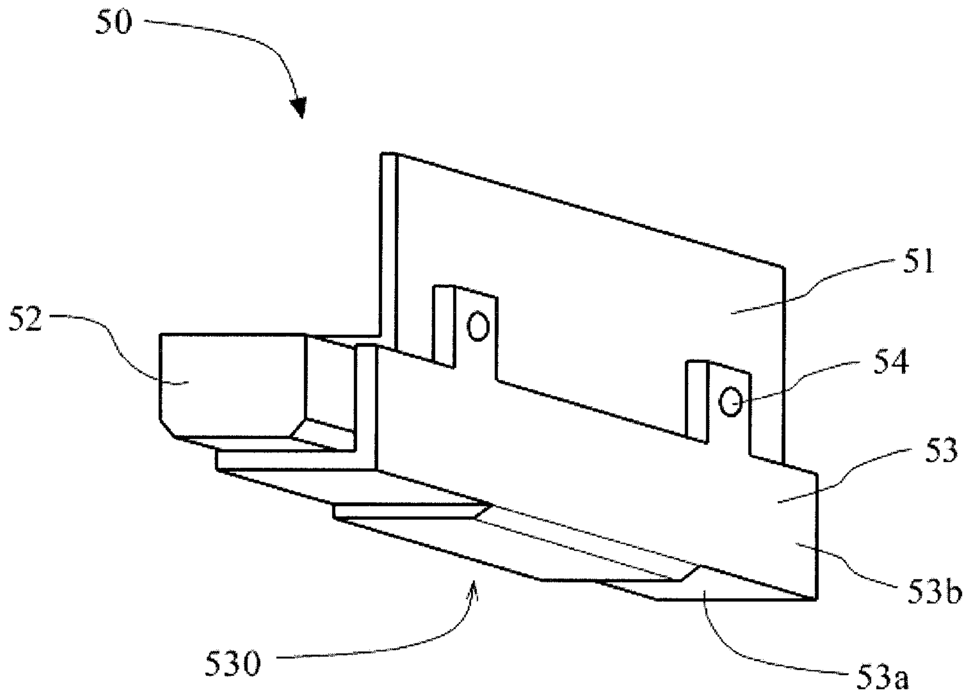
[Fig.8]
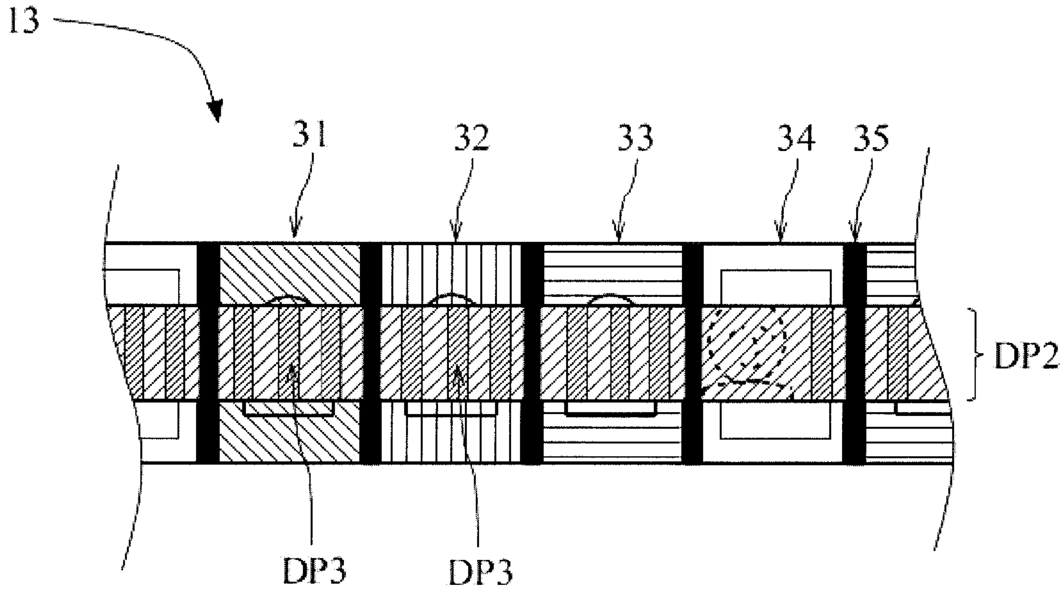

[Fig.9A]
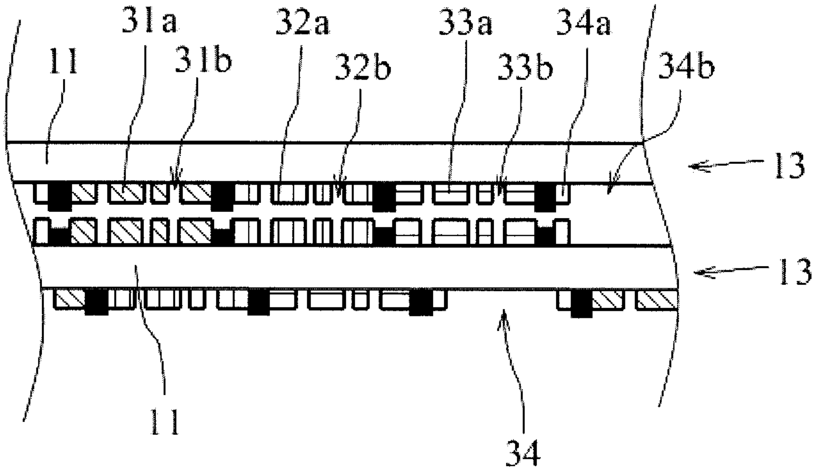
[Fig.9B]
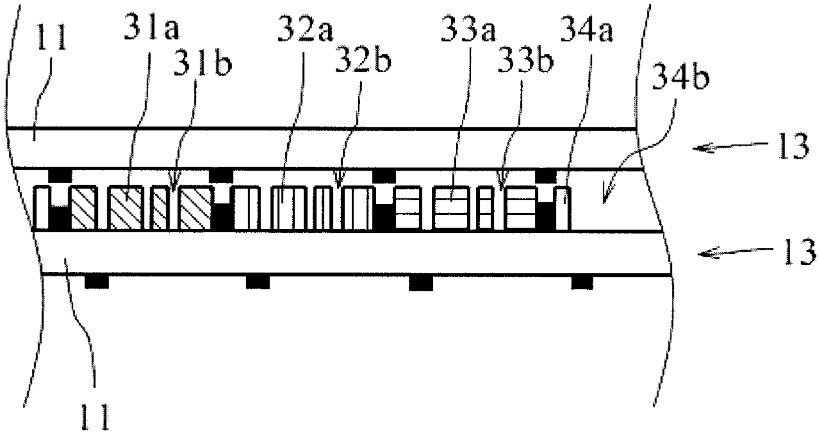

THERMAL TRANSFER SYSTEM INCLUDING HEATING ELEMENT HAVING CONTACT PORTION WITH MULTIPLE PROJECTING PORTIONS

TECHNICAL FIELD

The present disclosure relates to a thermal transfer system.

BACKGROUND ART

A transfer system that prints an image such as a character on a transfer receiver such as a card by using an ink ribbon is widely used. For example, the ink ribbon includes a ribbon (a support layer) that extends in a belt-like shape and an ink layer that is formed on the ribbon and that contains, for example, dye. During printing with the ink ribbon, ink is transferred to the transfer receiver in a pattern corresponding to a desired image to be printed. In this case, the ink ribbon after the ink is transferred has portions at which the ink is missing in a pattern corresponding to the printed image due to transfer to the transfer receiver. For this reason, the printed image can be identified from the ink ribbon after the ink is transferred. Accordingly, in the case where secret information such as ID information, for example, a name or an address is printed on the transfer receiver by using the ink ribbon, it is necessary for the ink ribbon after the ink is transferred to be carefully treated.

To confront such a problem, PTL 1, for example, has a proposition about a thermal transfer system that brings a heating element into contact with an outermost ink ribbon wound around a winding portion for the ink ribbon after the ink is transferred in a first pattern corresponding to ID information and that transfers a disturbing pattern to a support layer of the ink ribbon that is located inside the ink ribbon.

CITATION LIST

Patent Literature

PTL 1: Japanese Unexamined Patent Application Publication No. 2013-111866

SUMMARY OF INVENTION

Technical Problem

In recent years, there has been an increase in the need to protect private information. For this reason, the present inventors of the present disclosure have raised an issue for providing a thermal transfer system that can more appropriately prevent secret information from being leaked and conducted research diligently.

In view of the matters described above, it is an object of the present disclosure to provide a thermal transfer system that can appropriately prevent secret information from being leaked.

Solution to Problem

A thermal transfer system according to the present disclosure includes a winding portion that winds an ink ribbon that includes a support layer and an ink layer after ink in the ink layer is transferred to a transfer receiver, and a heating element that transfers the ink in the ink layer of the ink ribbon to the support layer of the ink ribbon that is located inside the ink ribbon that is wound around the winding portion in a stripe-shaped disturbing pattern that extends in a direction in which the ink ribbon is conveyed in a manner in which the ink ribbon that is wound around the winding portion is heated from the support layer. The heating element includes a contact portion including multiple projecting portions that come into contact with the ink ribbon and multiple recessed portions that do not come into contact with the ink ribbon, the multiple projecting portions and the multiple recessed portions being alternately arranged in a direction perpendicular to the direction in which the ink ribbon is conveyed.

As for the thermal transfer system, the heating element may include a heating head and a metal plate that is disposed on a surface of the heating head facing the ink ribbon, and the contact portion may be disposed on a surface of the metal plate facing the ink ribbon. The projecting portions and the recessed portions may have an elongated shape that extends in the direction in which the ink ribbon is conveyed.

As for the thermal transfer system, the multiple projecting portions may include a first projecting portion that has a relatively large projecting portion width that is equal to a length in the direction perpendicular to the direction in which the ink ribbon is conveyed and a second projecting portion the projecting portion width of which is relatively small. The first projecting portion may be located at a center of the contact portion in a width direction. The second projecting portion may be located in a region other than the center of the contact portion in the width direction.

As for the transfer system, the ink ribbon may transfer a face image to the transfer receiver by using the ink. As for the transfer system, the ink ribbon may transfer a face image that contains eyes to the transfer receiver by using the ink, and the first projecting portion may face a region that overlaps the eyes in the face image. As for the transfer system, the transfer receiver may be an ID card on which the face image is to be printed.

As for the thermal transfer system, in the ink ribbon, an OP ink layer and the ink layer in multiple colors or a single color may be periodically arranged on the support layer.

Advantageous Effects of Invention

A thermal transfer system according to the present disclosure can appropriately prevent secret information from being leaked.

BRIEF DESCRIPTION OF DRAWINGS

FIG. 1 is a front view schematically illustrating a thermal transfer system according to the present embodiment.

FIG. 2A is a plan view illustrating an ink ribbon in the thermal transfer system according to the present embodiment.

FIG. 2B is a longitudinal sectional view illustrating the ink ribbon in the thermal transfer system according to the present embodiment and illustrates a section taken along line A-A in FIG. 2A.

FIG. 3A is a plan view illustrating the ink ribbon after ink is transferred by using a first heating element.

FIG. 3B is a longitudinal sectional view illustrating the ink ribbon after the ink is transferred by using the first heating element and illustrates a section taken along line B-B in FIG. 3A.

FIG. 4 is a front view schematically illustrating a winding portion and a second heating element in the thermal transfer system according to the present embodiment.

FIG. 5A is a perspective view illustrating the second heating element according to the present embodiment.

FIG. 5B is a bottom view illustrating the second heating element according to the present embodiment.

FIG. 6 is a plan view illustrating the ink ribbon after the ink is transferred by using the second heating element according to the present embodiment.

FIG. 7 is a perspective view illustrating a second heating element in a comparative example.

FIG. 8 is a plan view illustrating the ink ribbon after the ink is transferred by using the second heating element in the comparative example.

FIG. 9A is a longitudinal sectional view of the ink ribbon and schematically illustrates an aspect of transfer by using the second heating element in the comparative example.

FIG. 9B is a longitudinal sectional view of the ink ribbon and schematically illustrates the aspect of transfer by using the second heating element in the comparative example.

DESCRIPTION OF EMBODIMENTS

An embodiment (referred to below as the "present embodiment") of the present disclosure will hereinafter be described with reference to the drawings.

The entire structure of a thermal transfer system 10 according to the present embodiment will now be described.

FIG. 1 is a front view schematically illustrating the thermal transfer system according to the present embodiment.

The thermal transfer system 10 transfers ink to a transfer receiver 14 in a desired pattern by using a belt-like ink ribbon 13 that includes a support layer 11 and an ink layer 12 that is stacked on a surface of the support layer 11.

The thermal transfer system 10 includes a feeding portion 16, multiple feeding guide rollers 15*a*, a first heating element 22, a platen roller 23, multiple winding guide rollers 15*b*, a winding portion 20, and a second heating element 50 in order from an upstream position in a direction in which the ink ribbon 13 is fed. The thermal transfer system 10 also includes a control unit 24 that controls the first heating element 22, the second heating element 50, and the winding portion 20.

The feeding portion 16 rotates in a direction illustrated by using an arrow R1 in FIG. 1 and feeds the ink ribbon 13 toward a downstream position.

The multiple feeding guide rollers 15*a* are arranged at intervals in a direction in which the ink ribbon 13 is conveyed and guide the ink ribbon 13 that is fed from the feeding portion 16 and that is conveyed toward the downstream position.

The platen roller 23 faces the first heating element 22 with the ink ribbon 13 to be conveyed and the transfer receiver 14 interposed therebetween and supports the transfer receiver 14.

The multiple winding guide rollers 15*b* are arranged at intervals in the direction in which the ink ribbon 13 is conveyed and guide the ink ribbon 13 that is conveyed from the upstream position to the winding portion 20.

The winding portion 20 rotates in a direction illustrated by using an arrow R2 in FIG. 1 and winds the ink ribbon 13 after the ink is transferred by using the first heating element 22.

For example, the control unit 24 outputs a control signal to driving units that drive the first heating element 22, the second heating element 50, and the winding portion 20 and consequently controls the operation of the first heating element 22, the second heating element 50, and the winding portion 20 described later.

FIG. 2A is a plan view illustrating the ink ribbon 13 in the thermal transfer system 10 according to the present embodiment. FIG. 2B is a longitudinal sectional view illustrating the ink ribbon 13 in the thermal transfer system 10 according to the present embodiment and illustrates a section taken along line A-A in FIG. 2A.

The ink ribbon 13 is a thermal sublimation ink ribbon that contains sublimation dye ink. The ink ribbon 13 includes the support layer 11 composed of a substantially transparent material and the ink layer 12 that is stacked on the support layer 11.

The support layer 11 is composed of, for example, various kinds of resin films that have sufficient strength and heat resistance to withstand thermal transfer.

The ink layer 12 includes a Y sublimation ink layer 31, an M sublimation ink layer 32, a C sublimation ink layer 33, an OP ink layer 34, and detection marks 35 that are made between these layers. The Y sublimation ink layer 31 is composed of yellow Y sublimation ink 31*a*. The M sublimation ink layer 32 is composed of magenta M sublimation ink 32*a*. The C sublimation ink layer 33 is composed of cyan C sublimation ink 33. The OP ink layer 34 is composed of OP (overprint) ink for forming a substantially transparent protective layer.

The Y sublimation ink layer 31, the M sublimation ink layer 32, the C sublimation ink layer 33, and the OP ink layer 34 are periodically arranged on the support layer 11 in the longitudinal direction (that is, a direction in which the ink ribbon 13 extends) of the ink ribbon 13.

The three kinds of the sublimation ink in the Y sublimation ink layer 31, the M sublimation ink layer 32, and the C sublimation ink layer 33 are transferred to the transfer receiver 14, and consequently, a color image can be printed on the transfer receiver 14. The OP ink layer 34 is transferred to the transfer receiver 14, and consequently, a protective layer for protecting the color image that is printed on the transfer receiver 14 can be formed.

The detection marks 35 are made on boundary portions among the Y sublimation ink layer 31, the M sublimation ink layer 32, the C sublimation ink layer 33, and the OP ink layer 34. The detection marks 35 are made to identify the positional relationship between the ink ribbon 13 and the first heating element 22 and the kind of the ink layer 12 by using a detection unit (not illustrated) in the thermal transfer system 10. The detection marks 35 have different features (lengths, thicknesses, patterns) depending on the positions at which the detection marks 35 are made. For this reason, when the first heating element 22 transfers a predetermined kind of ink to the transfer receiver 14, the first heating element 22 can heat the ink layer 12 that contains the predetermined kind of ink, based on information that is acquired from the detection marks 35. In the case where a means for identifying the kind of the ink layer 12 such as a color sensor other than the detection marks 35 is used, the detection marks 35 can be omitted.

The sublimation ink to be used is not limited by the three kinds described above, but sublimation ink in another color may be used, or a single kind, two kinds, or four kinds or more of sublimation ink may be used.

An example of the first heating element 22 is a thermal head that includes a heat generating element that generates heat due to energization. The first heating element 22 is disposed so as to face the support layer 11 of the ink ribbon 13 as illustrated in an enlarged view at a lower position in FIG. 1. The first heating element 22 heats the ink ribbon 13 from the support layer 11. The first heating element 22 heats the ink in the ink layer 12 of the ink ribbon 13 in a first pattern that is a predetermined pattern corresponding to, for example, ID information such as a face image, and consequently, the ink in the ink layer 12 of the ink ribbon 13 is transferred to the transfer receiver 14 in the first pattern.

The first pattern corresponds to a face image that represents the face of a person to be transferred to an identification, that is, an ID card, such as a photograph in a driver license, an employee identification card, or a passport. Strictly speaking, the transfer patterns of the Y sublimation ink layer 31, the M sublimation ink layer 32, and the C sublimation ink layer 33 differ from each other, but these are collectively referred to as the first pattern in the present specification.

The transfer of the ink to the transfer receiver 14 in the first pattern by using the first heating element 22 will now be specifically described.

The transfer receiver 14 is first conveyed to a position between the first heating element 22 and the platen roller 23 by using a conveyance unit (not illustrated) that conveys the transfer receiver 14. The winding portion 20 rotates in the R2 direction in FIG. 1 and winds the ink ribbon 13. The feeding portion 16 rotates in the R1 direction in FIG. 1 and feeds the ink ribbon 13 to the downstream position. The ink ribbon 13 that is fed from the feeding portion 16 passes through the multiple feeding guide rollers 15 and reaches a position between the first heating element 22 and the platen roller 23.

The detection unit (not illustrated) that detects the detection marks 35 of the ink ribbon 13 detects the Y sublimation ink layer 31 that reaches the position between the first heating element 22 and the platen roller 23, and the first heating element 22 is pressed against the transfer receiver 14 while heating the Y sublimation ink layer 31 in the first pattern. Consequently, the Y sublimation ink 31*a* in the Y sublimation ink layer 31 of the ink ribbon 13 is transferred to the transfer receiver 14 in the first pattern.

Subsequently, the transfer receiver 14 to which the Y sublimation ink 31*a* is transferred is returned to the position between the first heating element 22 and the platen roller 23 toward the upstream position. The ink ribbon 13 is conveyed further toward the downstream position by using the winding portion 20 and the feeding portion 16. The detection unit (not illustrated) detects the M sublimation ink layer 32 that reaches the position between the first heating element 22 and the platen roller 23, and the first heating element 22 is pressed against the transfer receiver 14 while heating the M sublimation ink layer 32 in the first pattern. Consequently, the Y sublimation ink 32*a* in the M sublimation ink layer 32 of the ink ribbon 13 is transferred to the transfer receiver 14 in the first pattern.

Subsequently, the transfer receiver 14 to which the Y sublimation ink 31*a* and the M sublimation ink 32*a* are transferred is returned to the position between the first heating element 22 and the platen roller 23 toward the upstream position. The ink ribbon 13 is conveyed further toward the downstream position by using the winding portion 20 and the feeding portion 16. The detection unit (not illustrated) detects the C sublimation ink layer 33 that reaches the position between the first heating element 22 and the platen roller 23, and the first heating element 22 is pressed against the transfer receiver 14 while heating the C sublimation ink layer 33 in the first pattern. Consequently, the C sublimation ink 33*a* in the C sublimation ink layer 33 of the ink ribbon 13 is transferred to the transfer receiver 14 in the first pattern.

Subsequently, the transfer receiver 14 to which the Y sublimation ink 31*a*, the M sublimation ink 32*a*, and the C sublimation ink 33*a* are transferred is returned to the position between the first heating element 22 and the platen roller 23 toward the upstream position. The ink ribbon 13 is conveyed further toward the downstream position by using the winding portion 20 and the feeding portion 16. The detection unit (not illustrated) detects the OP ink layer 34 that reaches the position between the first heating element 22 and the platen roller 23, and the first heating element 22 is pressed against the transfer receiver 14 while heating the OP ink layer 34 in a predetermined pattern (a protection pattern) that covers the first pattern. Consequently, OP ink 34*a* in the OP ink layer 34 of the ink ribbon 13 is transferred to the transfer receiver 14 in the protection pattern.

The first heating element 22 thus repeats the transfer of the ink to the transfer receiver 14 in the first pattern or the protection pattern whenever the ink ribbon 13 in a predetermined feed amount corresponding to an interval between the detection marks 35 is fed from the feeding portion 16.

FIG. 3A is a plan view illustrating the ink ribbon 13 after the ink is transferred by using the first heating element 22. FIG. 3B is a longitudinal sectional view illustrating the ink ribbon 13 after the ink is transferred by using the first heating element 22 and illustrates a section taken along line B-B in FIG. 3A.

With the result that the first heating element 22 transfers the ink as described above, ink-missing portions 31*b*, 32*b*, and 33*b* in the first pattern are formed in the Y sublimation ink layer 31, the M sublimation ink layer 32, and the C sublimation ink layer 33 of the ink ribbon 13, and an ink-missing portion 34*b* in the protection pattern is formed in the OP ink layer 34. In this case, as illustrated in FIG. 3A, the patterns of the ink-missing portions 31*b*, 32*b*, and 33*b* in the ink ribbon 13 after the ink is transferred correspond to the first pattern regarding the first heating element 22 described above. For this reason, the ID information such as the face image that is printed on the transfer receiver 14 can be identified based on the patterns of the ink-missing portions 31*b*, 32*b*, and 33*b*.

FIG. 4 is a front view schematically illustrating the winding portion 20 and the second heating element 50 in the thermal transfer system 10 according to the present embodiment.

As illustrated in FIG. 4, the winding portion 20 winds the ink ribbon 13 such that the support layer 11 of the ink ribbon 13 is located outside the ink layer 12. In the present specification, the ink ribbon 13 that is located at the outermost circumference regarding the ink ribbon 13 that is wound around the winding portion 20 is referred to as an outer ink ribbon 13A, and the ink ribbon 13 that is wound around the winding portion 21 inside the outer ink ribbon 13A and that is adjacent to the outer ink ribbon 13A is referred to as an inner ink ribbon 13B.

The second heating element 50 is located near the winding portion 20 and is movable in a direction illustrated by using an arrow R3 in FIG. 4, that is, a direction in which the second heating element 50 approaches or leaves from the winding portion 20 by using the power of a drive source, not illustrated, such as a motor. The second heating element 50 moves so as to approach the winding portion 20 and heats the outer ink ribbon 13A from the support layer 11 when the winding portion 20 winds the ink ribbon 13.

FIG. 5A is a perspective view illustrating the second heating element 50 according to the present embodiment. FIG. 5B is a bottom view illustrating the second heating element 50 according to the present embodiment.

The second heating element 50 includes a heating head 52 that includes a ceramic substrate, a metal plate 53 that is disposed on a surface of the heating head 52 facing the ink ribbon 13, and a support frame 51 that supports the heating head 52 and the metal plate 53. In an example illustrated, the heating head 52 and the metal plate 53 are fixed to the support frame 51.

The metal plate 53 has a thickness of 0.3 mm to 0.5 mm, includes a metal plate body 20*a* that comes into contact with the ink ribbon 13 and a support plate 53*b* that is coupled with the metal plate body 53*a*, and has an L-shaped section as a whole. In an example illustrated in FIG. 5A, the metal plate 53 is fixed to the support frame 51 in a manner in which the support plate 53*b* is fixed to the support frame 51 by using mounting bolts 54.

The metal plate 53 is composed of, for example, copper or aluminum, is a thin plate as a whole, and has excellent thermal conductivity. Thermally conductive grease (not illustrated) is between the heating head 52 and the metal plate 53. For this reason, heat from the heating head 52 can be transferred to the ink ribbon 13 via the metal plate 53 with certainty.

A buffering process is performed on the metal plate 53 in advance, and the surface roughness thereof (arithmetic average roughness) is 0.004 μm to 0.02 μm.

After the buffering process, a surface process such as a plating process, a coating process, or a deposition process is performed on the metal plate 53, and the surface of the metal plate 53 has excellent slipperiness, wear resistance, and heat resistance.

Specifically, a surface process of reducing friction is performed on the metal plate 53 by using hard chromium or NIFGRIP made by ULVAC, Inc. A NIFGRIP process means a process in which a eutectoid reaction between electroless nickel and fluorine resin is caused in a process liquid, a film is formed on a copper or aluminum material by using the process liquid such that the film contains fluorine resin in a volume ratio of 30%, and a heat treatment is performed to firmly bring the electroless nickel and the fluorine resin in the film into close contact with each other after the film is formed. The NIFGRIP process is excellent in close contact between the material and the film and belongs to a surface process technique that enables a high-performance composite film that is excellent in mold releasability, non-stickiness, slipperiness, and corrosion resistance to be formed.

As a result of the surface process, the surface roughness (arithmetic average roughness) of the surface of the metal plate 53 is 0.004 μm to 0.02 μm, and the coefficient of friction thereof is 0.2 or less, preferably about 0.1 as a whole.

The second heating element 50 includes a contact portion 530 that comes into contact with the ink ribbon 13 when the second heating element 50 moves so as to approach the winding portion 20. As for the contact portion 530, multiple projecting portions 531 that come into contact with the ink ribbon 13 and multiple recessed portions 532 that do not come into contact with the ink ribbon 13 are alternately arranged in the width direction (that is, the direction perpendicular to the direction in which the ink ribbon 13 is conveyed). That is, the contact portion 530 includes the multiple projecting portions 531 that come into contact with the ink ribbon 13 and the multiple recessed portions 532 that do not come into contact with the ink ribbon 13, and the multiple projecting portions 531 and the multiple recessed portions 532 are alternately arranged in the width direction.

In the example illustrated in FIG. 5A and FIG. 5B, the contact portion 530 is disposed on the metal plate body 53*a* of the metal plate 53 and includes the multiple projecting portions 531 that come into contact with the ink ribbon 13 and the recessed portions 532 that are located between the projecting portions 531 and that do not come into contact with the ink ribbon 13. The projecting portions 531 have an elongated shape that extends in the direction in which the ink ribbon 13 is conveyed.

The contact portion 530 that includes the projecting portions 531 and the recessed portions 532 can be manufactured, for example, in a manner in which the recessed portions 532 are formed by performing a milling process on the contact portion 530 that is flat.

FIG. 6 is a plan view illustrating the ink ribbon 13 after the ink is transferred by using the second heating element 50 according to the present embodiment.

When the winding portion 20 winds the ink ribbon 13 during the transfer of the ink by using the first heating element 22, the second heating element 50 moves so as to approach the winding portion 20. At this time, the projecting portions 531 of the contact portion 530 of the metal plate 53 come into contact with the ink ribbon 13. While the projecting portions 531 of the second heating element 50 are in contact with the ink ribbon 13, the winding portion 20 repeatedly starts winding the ink ribbon 13 in a predetermined feed amount and stops winding the ink ribbon 13. At this time, the second heating element 50 heats the outer ink ribbon 13A from the support layer 11.

Consequently, the second heating element 50 transfers at least a part of the ink in the ink layer 12 in a region of the outer ink ribbon 13A in contact with the projecting portions 531 to the support layer 11 of the inner ink ribbon 13B in a second pattern DP1 that is a stripe-shaped disturbing pattern that extends in the direction in which the ink ribbon 13 is conveyed.

As a result of the transfer, the ink layer 12 of the outer ink ribbon 13A has the first pattern corresponding to the ID information such as the face image and the stripe-shaped second pattern DP1 that extends in the longitudinal direction of the ink ribbon 13. A pattern that has the first pattern and the second pattern DP1 is transferred to the support layer 11 of the inner ink ribbon 13B. For this reason, as for the ink ribbon 13 after the ink is transferred by using the second heating element 50, as illustrated in FIG. 6, it is difficult to recognize the patterns of the ink-missing portions 31*b*, 32*b*, and 33*b* in the first pattern corresponding to the ID information such as the face image.

The second pattern DP1 that is the stripe-shaped disturbing pattern described above will now be described in detail.

FIG. 7 is a perspective view illustrating a second heating element 50 in a comparative example. FIG. 8 is a plan view illustrating the ink ribbon 13 after the ink is transferred by using the second heating element 50 in the comparative example.

As a result of research, the present inventors of the present disclosure have conceived that the disturbing pattern is transferred by using the second heating element 50 in the comparative example.

The second heating element 50 in the comparative example differs from the present embodiment in that a contact portion 530 does not include multiple projecting portions but is flat. The other components of the second heating element 50 in the comparative example are the same as those of the second heating element 50 according to the present embodiment.

The second heating element 50 in the comparative example transfers at least a part of the ink in the ink layer 12 in a region of the outer ink ribbon 13A in contact with the contact portion 530 to the support layer 11 of the inner ink ribbon 13B in a wide belt-like pattern DP2 that extends in the direction in which the ink ribbon 13 is conveyed when the outer ink ribbon 13A is heated from the support layer 11.

The wide belt-like pattern DP2 typically overlaps a vertically linear pattern DP3 that extends in the width direction (that is, the direction perpendicular to the direction in which the ink ribbon 13 is conveyed). The reason is that the winding portion 20 repeatedly starts winding the ink ribbon 13 in a predetermined feed amount and stops winding the ink ribbon 13 while the contact portion 530 of the second heating element 50 is in contact with the ink ribbon 13. That is, the ink ribbon 13 is relatively gently heated when the winding portion 20 winds the ink ribbon 13, and the ink ribbon 13 is relatively strongly heated when the winding portion 20 stops winding the ink ribbon 13. For this reason, the amount of the transferred ink differs between positions, and consequently, the vertically linear pattern DP3 overlaps the wide belt-like pattern DP2.

The heat of the contact portion 530 of the second heating element 50 is transferred to not only the outer ink ribbon 13A but also the inner ink ribbon 13B away toward the center of the winding portion 20 and the ink ribbon 13 further away toward the center. Consequently, as for the inner ink ribbon 13B and the ink ribbon 13 further away toward the center, the ink in the ink layer 12 is transferred. For this reason, the period of the vertically linear pattern DP3 that overlaps the wide belt-like pattern DP2 is typically smaller than the predetermined feed amount corresponding to the interval between the detection marks 35 of the ink ribbon 13.

As for the ink ribbon 13 after the ink is transferred by using the second heating element 50 in the comparative example, the wide belt-like pattern DP2 that overlaps the vertically linear pattern DP3 makes it difficult to recognize the patterns of the ink-missing portions 31*b*, 32*b*, and 33*b* in the first pattern.

As for the second heating element 50 in the comparative example, however, the present inventors of the present disclosure have found the following problems.

FIG. 9A and FIG. 9B illustrate longitudinal sectional views of the ink ribbon 13 and schematically illustrates an aspect of transfer by using the second heating element 50 in the comparative example.

A first finding is that as illustrated in FIG. 9A and FIG. 8, there is a possibility that the patterns of the ink-missing portions 31*b*, 32*b*, and 33*b* in the first pattern can be recognized in the region of the OP ink layer 34 of the ink ribbon 13 after the transfer to the support layer 11 in the region of the OP ink layer 34 that is substantially transparent by using the second heating element 50.

Additional findings are as follows. As the time of heating by using the second heating element 50 increases, the heat from the second heating element 50 is transferred toward the center of the winding portion 20, and this facilitates the transfer of the ink in the ink layer 12 of the ink ribbon 13 that is wound around the winding portion 20. Consequently, in some cases, the entire ink in the ink layer 12 in a region in contact with the contact portion 530 is transferred to the support layer 11 of the ink ribbon 13 located inside. As illustrated in FIG. 9B, such transfer (referred to below as "complete transfer") results in the transfer of the ink in the ink layer 12 of the ink ribbon 13 located outside to the region of the ink ribbon 13 that becomes substantially transparent due to missing ink in the ink layer 12 and that is located inside. Consequently, there is a possibility that the patterns of the ink-missing portions 31*b*, 32*b*, and 33*b* in the first pattern can be recognized.

In view of this, the second heating element 50 according to the present embodiment includes the contact portion 530 where the multiple projecting portions 531 and the multiple recessed portions 532 are alternately arranged in the width direction (that is, the direction perpendicular to the direction in which the ink ribbon is conveyed), and the second pattern DP1 that is the stripe-shaped disturbing pattern that extends in the direction in which the ink ribbon 13 is conveyed is transferred as described above.

As for the ink ribbon 13 after the ink is transferred by using the second heating element 50 according to the present embodiment, the stripe-shaped second pattern DP1 makes it difficult to recognize the patterns of the ink-missing portions 31*b*, 32*b*, and 33*b* in the first pattern also in the case of the complete transfer or the transfer to the region of the OP ink layer 34 described above.

The projecting portions 531 of the contact portion 530 according to the present embodiment have different lengths (referred to below as "projecting portion widths Wa") in the width direction (that is, the direction perpendicular to the direction in which the ink ribbon 13 is conveyed) depending on positions at which the projecting portions 531 are located. In the example illustrated in FIG. 5B and FIG. 6, the value of the projecting portion width Wa of the projecting portion 531 that is located at the center of the contact portion 530 in the width direction is relatively large, and the values of the projecting portion widths Wa of the other projecting portions 531 are relatively small.

In the example illustrated in FIG. 5B, the recessed portions 532 of the contact portion 530 have the same length (referred to as a "recessed portion width Wb") in the width direction (that is, the direction perpendicular to the direction in which the ink ribbon 13 is conveyed) regardless of positions at which the recessed portions 532 are located. The reason is to make it easy to form the recessed portions 532 by performing the milling process. For this reason, the recessed portions 532 may have different recessed portion widths Wb depending on the positions at which the recessed portions 532 are located.

The projecting portion 531 that has the relatively large projecting portion width Wa faces a region that overlaps a characteristics part among the ink-missing portions 31*b*, 32*b*, and 33*b* in the first pattern. The region that overlaps the characteristics part is typically located at the center of the contact portion 530 in the width direction (that is, the direction perpendicular to the direction in which the ink ribbon 13 is conveyed). That is, the multiple projecting portions 531 according to the present embodiment include a first projecting portion that has a relatively large projecting portion width Wa and a second projecting portion the projecting portion width of which is relatively small. The first projecting portion is located at the center of the contact portion 530 in the width direction. The second projecting portion is located in a region other than the center of the contact portion 530 in the width direction.

The projecting portion width Wa of the projecting portion 531 that faces the region that overlaps the characteristics part and the recessed portion width Wb of each recessed portion 532 are set such that the characteristics part in the first pattern is effectively divided. Specifically, the projecting portion width Wa is set to be 5% or more and 10% or less of the length of the characteristics part in the width direction (that is, the direction perpendicular to the direction in which the ink ribbon 13 is conveyed), and the recessed portion width Wb is set to be 5% or more and 10% or less of the length of the characteristics part in the width direction. This enables the characteristics part in the first pattern to be effectively divided, and it can be consequently more difficult to recognize the patterns of the ink-missing portions 31*b*, 32*b*, and 33*b*.

In the example illustrated in FIG. 5B and FIG. 6, the projecting portion 531 (the first projecting portion) that has the large projecting portion width Wa faces a region that overlaps the eyes in order to divide the region of the eyes corresponding to characteristics parts in the face image at the ink-missing portions 31*b*, 32*b*, and 33*b* in the first pattern corresponding to the face image. The projecting portion width Wa of the projecting portion 531 that faces the region that overlaps the eyes and the recessed portion width Wb of each recessed portion 532 are set such that the region of the eyes is effectively divided. Specifically, the projecting portion width Wa is set to be 10% or more and 15% or less of the length of the region of the eyes in the width direction (that is, the direction perpendicular to the direction in which the ink ribbon 13 is conveyed), and the recessed portion width Wb is set to be 5% or more and 10% or less of the length of the region of the eyes in the width direction.

In the example illustrated in FIG. 5B and FIG. 6, the projecting portion widths Wa of the projecting portions 531 that are arranged near both ends of the contact portion 530 are also relatively large. The reason is that the regions of the eyebrows and the mouth have a characteristics part in the face image in some cases.

The length (referred to below as a "contact portion width Wc") of the contact portion 530 of the second heating element 50 in the width direction (that is, the direction perpendicular to the direction in which the ink ribbon 13 is conveyed) is set so as to cover at least main parts of the patterns of the ink-missing portions 31*b*, 32*b*, and 33*b* in the first pattern. For example, in the case where the first pattern corresponds to the face image, the contact portion width Wc is set so as to cover the entire region from the head to the mouth in the face image.

From the perspective in the recognition of the patterns of the ink-missing portions 31*b*, 32*b*, and 33*b* in the first pattern such as the face image, each projecting portion width Wa is preferably 0.5 mm or more and 1.5 mm or less. From the same perspective, the recessed portion width Wb is preferably 0.5 mm or more and 1.5 mm or less. The contact portion width Wc is preferably 15 mm or more, based on the typical size of the face image to be printed on, for example, an IC card.

The thermal transfer system 10 according to the present embodiment includes the winding portion 20 that winds the ink ribbon 13 that includes the support layer 11 and the ink layer 12 after the ink in the ink layer 12 is transferred to the transfer receiver 14, and the heating element 50 that transfers the ink in the ink layer 12 of the ink ribbon 13 to the support layer 11 of the ink ribbon 13 that is located inside the ink ribbon 13 in the stripe-shaped disturbing pattern DP1 that extends in the direction in which the ink ribbon 13 is conveyed in a manner in which the ink ribbon 13 that is wound around the winding portion 20 is heated from the support layer 11. The heating element 50 includes the contact portion 530 including the multiple projecting portions 531 that come into contact with the ink ribbon 13 and the multiple recessed portions 532 that do not come into contact with the ink ribbon 13, and the multiple projecting portions 531 and the multiple recessed portions 532 are alternately arranged in the direction perpendicular to the direction in which the ink ribbon 13 is conveyed, as described above.

The thermal transfer system 10 can appropriately disturb the ink-missing portions in the first pattern corresponding to, for example, the ID information and can appropriately prevent secret information from being leaked. The thermal transfer system 10 is preferably used when the first pattern corresponds to the face image, that is, when the first heating element 22 transfers the face image to the transfer receiver 14, or additionally when the transfer receiver 14 is an ID card on which the face image is printed.

The embodiment of the present invention is described above by way of example. The present disclosure, however, is not limited to the embodiment described above, and various modifications can be made within the scope of claims.

For example, the present disclosure is not limited to a structure for transferring a color image by using an ink ribbon that includes an OP ink layer and an ink layer in multiple colors but can be used for a structure for transferring a color image by using multiple ink ribbons that include ink layers or OP ink layers in respective different colors.

REFERENCE SIGNS LIST

- 10 thermal transfer system
- 13 ink ribbon
  - 11 support layer
  - 12 ink layer
    - 31 Y sublimation ink layer
      - 31*a* Y sublimation ink, 31*b* ink-missing portion
    - 32 M sublimation ink layer
      - 32*a* M sublimation ink, 32*b* ink-missing portion
    - 33 C sublimation ink layer
      - 33*a* C sublimation ink, 33*b* ink-missing portion
    - 34 OP ink layer
      - 34*a* OP ink, 34*b* ink-missing portion
    - 35 detection mark
- 14 transfer receiver
- 15*a* feeding guide roller
- 15*b* winding guide roller
- 16 feeding portion
- 20 winding portion
- 22 first heating element
- 23 platen roller
- 24 control unit
- 50 second heating element
  - 51 support frame
  - 52 heating head
  - 53 metal plate
    - 53*a* metal plate body
    - 53*b* support plate
    - 530 contact portion
      - 531 projecting portion
      - 532 recessed portion
- 54 mounting bolt

The invention claimed is:

1. A thermal transfer system comprising:

a winding portion that winds an ink ribbon that includes a support layer and an ink layer after ink in the ink layer is transferred to a transfer receiver; and a heating element that transfers the ink in the ink layer of the ink ribbon to the support layer of the ink ribbon that is located inside the ink ribbon that is wound around the winding portion in a stripe-shaped disturbing pattern that extends in a direction in which the ink ribbon is conveyed in a manner in which the ink ribbon that is wound around the winding portion is heated from the support layer, wherein the heating element includes a contact portion including multiple projecting portions that come into contact with the ink ribbon and multiple recessed portions that do not come into contact with the ink ribbon, the multiple projecting portions and the multiple recessed portions being alternately arranged in a direction perpendicular to the direction in which the ink ribbon is conveyed, wherein the multiple projecting portions include a first projecting portion that has a relatively large projecting portion width that is equal to a length in the direction perpendicular to the direction in which the ink ribbon is conveyed and a second projecting portion the projecting portion width of which is relatively small, wherein the first projecting portion is located at a center of the contact portion in a width direction, and wherein the second projecting portion is located in a region other than the center of the contact portion in the width direction.

2. The thermal transfer system according to claim 1, wherein the heating element includes a heating head and a metal plate that is disposed on a surface of the heating head facing the ink ribbon, and wherein the contact portion is disposed on a surface of the metal plate facing the ink ribbon.

3. The thermal transfer system according to claim 1, wherein the projecting portions and the recessed portions have an elongated shape that extends in the direction in which the ink ribbon is conveyed.

4. The thermal transfer system according to claim 1, wherein the ink ribbon transfers a face image to the transfer receiver by using the ink.

5. The thermal transfer system according to claim 1, wherein the ink ribbon transfers a face image that contains eyes to the transfer receiver by using the ink, and wherein the first projecting portion faces a region that overlaps the eyes in the face image.

6. The thermal transfer system according to claim 1, wherein in the ink ribbon, an OP ink layer and the ink layer in multiple colors or a single color are periodically arranged on the support layer.

7. A thermal transfer system comprising:

a winding portion that winds an ink ribbon that includes a support layer and an ink layer after ink in the ink layer is transferred to a transfer receiver; and a heating element that transfers the ink in the ink layer of the ink ribbon to the support layer of the ink ribbon that is located inside the ink ribbon that is wound around the winding portion in a stripe-shaped disturbing pattern that extends in a direction in which the ink ribbon is conveyed in a manner in which the ink ribbon that is wound around the winding portion is heated from the support layer, wherein the heating element includes a contact portion including multiple projecting portions that come into contact with the ink ribbon and multiple recessed portions that do not come into contact with the ink ribbon, the multiple projecting portions and the multiple recessed portions being alternately arranged in a direction perpendicular to the direction in which the ink ribbon is conveyed, wherein the ink ribbon transfers a face image to the transfer receiver by using the ink, and wherein the transfer receiver is an ID card on which the face image is to be printed.

* * * * *